Figure 1:
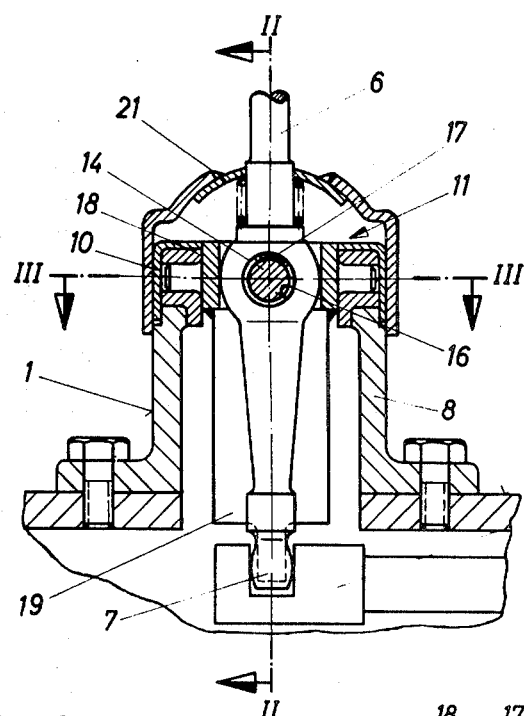

United States Patent

[11] 3,602,060

| | | |
|---|---|---|
| [72] | Inventor | Alfred Magg<br>Friedrichshafen, Germany |
| [21] | Appl. No. | 858,607 |
| [22] | Filed | Sept. 17, 1969 |
| [45] | Patented | Aug. 31, 1971 |
| [73] | Assignee | Zahnradfabrik Friedrichshafen AG<br>Friedrichshafen, Germany |
| [32] | Priority | Oct. 1, 1968 |
| [33] | | Germany |
| [31] | | P 18 00 163.3 |

[54] GEARSHIFT LEVER MECHANISM
6 Claims, 3 Drawing Figs.

[52] U.S. Cl. ............................................. 74/477
[51] Int. Cl. ............................................. G05g 9/02
[50] Field of Search............................................. 74/477, 476, 475, 473

[56] References Cited
FOREIGN PATENTS
252,291   5/1926   Great Britain................ 74/477

*Primary Examiner*—Milton Kaufman
*Attorney*—Albert M. Zalkind

ABSTRACT: A gearshift lever is universally mounted by means of a pin carried in a gimbal ring. The lever can swing in two planes, the swinging in one plane by virtue of the gimbal ring being to a particular position for selection of a shift rod to be moved when the lever is subsequently swung on the pin in a plane at right angles to the plane of swinging of the gimbal ring. The gimbal ring is provided with locking fingers which overlap in notches in respective pairs of shift rods, depending upon the direction of swinging of the lever for selection of a shift rod. The action thus provides for locking in position those shift rods which are not intended to be shifted. Antifriction bearings and bushings are used for ease of operation.

PATENTED AUG 31 1971  3,602,060

INVENTOR:
Alfred Magg

ATTORNEY
Albert Zalkind

GEARSHIFT LEVER MECHANISM

In prior art selective gearshift lever arrangements, difficulties arise due to the manner in which a universal joint using a swivel ball is constructed, particularly in arrangements of offset movement levers. In addition, such prior art arrangements have required fairly complex devices for locking the gearshift lever in a selected position dependent upon a selected speed. For example, such locking devices have generally required expensive slotted guide plates and bores.

The present invention overcomes difficulties of the prior art by providing a gearshift lever having a pivotal mount constrained to swinging in a respective plane to effect thrust on a selected shift rod. Such mount is actually a trunnion or pin carried diametrically in a gimbal ring. The gimbal ring is pivotally supported on trunnion pins coplanar with the aforementioned pin but on an axis normal thereto.

The gimbal ring pins are carried on a fixed housing of the transmission and permit a degree of swinging in a plane at right angles to the plane of swinging of the lever about its support pin. The lever has a finger which can engage a notch of a selected shift rod when the lever is swung about the gimbal ring pivotal axis. Thereafter swinging of the lever about its support pin within the gimbal ring effects an axial force on the selected rod in either direction for gear shifting.

Carried by the gimbal ring are a pair of locking fingers, one on each side of the lever finger and disposed so that when the lever is swung about the gimbal ring axis for selection of a shift rod, one or the other of the locking fingers will overlap the notches of adjoining shift rods and thus, due to the fact that these locking fingers are constrained by attachment to the gimbal ring from swinging in the direction of thrust force, a locking effect for those shift rods not intended to be shifted is achieved.

The construction is quite simple and very economical in manufacture as compared with prior art mechanisms for producing the same effect. Further, the mechanism of the invention is inherently adaptable to arrangements where a large degree of swing is required without producing any undue stresses on the support mount components.

By suitable use of antifriction bearings in conjunction with the other components of the invention, much frictional resistance ordinarily met in manually operable gearshift mechanisms is avoided.

Figure 2:
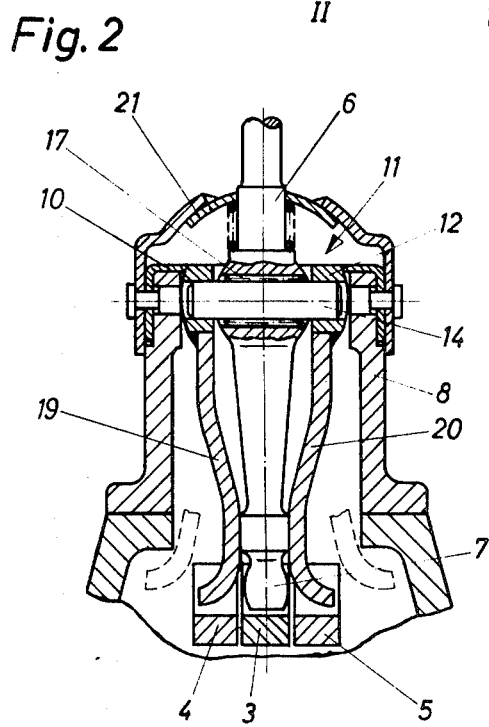
Figure 3:
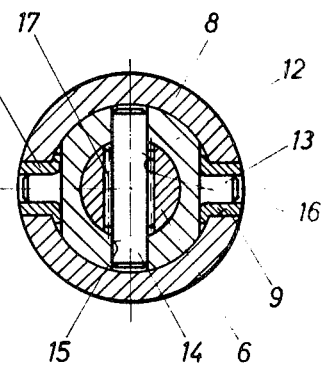

A detailed description of the invention now follows in conjunction with the appended drawing in which:

FIG. 1 is a cross section in elevation showing the essential components of the invention, FIG. 2 is a cross section in elevation taken on the section line II—II of FIG. 1, and, FIG. 3 is a horizontal section taken on the section line III—III of FIG. 1.

Referring to the drawing, a vertical cylindrical housing 1 for support of the gearshift lever 6 is bolted to the transmission housing 2 which houses gearshift rods 3, 4 and 5. The gearshift lever 6 has a terminal finger 7 disposable in the end notches of the rods in the usual manner and it will be understood that if the lever is swung in the plane of the paper about the axis of pin 14 as viewed in FIG. 1, it can shift the rod 3 from the neutral position shown, in either direction.

The lever 6 can likewise be swing in the plane of the paper as viewed on FIG. 2 so that the finger 7 can be brought into the notch of shift rod 4 or 5 for selection of either of these rods to be actuated by subsequent swinging of the lever in a direction axially of the selected rod.

Lever 6 is preferably formed with a ball formation carried on pin 14 which comprises a universal joint 11 in conjunction with a gimbal ring 12 carried on trunnion pins 13 having bearing support in plastic bushings 18 diametrically disposed in slots 9 at the upper end of housing 8.

Thus, pin 14 passes through a bore 16 of ball formation and is encompassed by a needle bearing 17 for frictionless pivotal support of lever 6 when the lever is swung to exert thrust. The ends of pin 14 have pivotal support in bores 15 diametrically opposed in the gimbal ring 12.

From the above description and upon consideration of the drawing, it will be apparent that the axes of pins 13 and 14 are coplanar, being generally horizontal, and the axis of pin 14 is at right angles to the axis of pins 13.

A retaining cap 10 has a force fit periphally around a turned-down upper section of housing 8 and locks the plastic bushings 18, and thus locks the universal joint mechanism 11 in place.

The upper end of the construction is provided with a dome pinned to housing 8 in a manner readily understood from the drawing and a dust cap 21 encompasses the lever and is spring biased so as to close the aperture in the dome in which the lever must swing.

In order to make certain that only one rod 3, 4 or 5 can be shifted at a time, locking fingers 19 and 20 are secured as by welding to gimbal ring 12 on respective sides of lever 6. It will be noted that such fingers terminate in narrowed curved locking tongues (shown dotted in FIG. 1 for finger 19). These terminal tongues are substantially in the same operating position as finger 7. Accordingly as indicated by the dashed lines in FIG. 2, it will be apparent that either tongue can swing clear of the rod notches dependent upon the direction of swinging of lever 6 for rod selection. However, the other tongue will then bridge the gap between the notches of two of the rods and since neither tongue can swing in the plane of the paper as viewed on FIG. 1, the tongue in overlapping position will lock the respective rods against shifting while the lever is shifting the third rod.

The above holds true for shifting of the lever left or right for rod selection as viewed in FIG. 2. Also it can readily be understood from FIG. 2 that if lever 6 is swung into or out of the plane of the paper to shift rod 3, then rods 4 and 5 are locked by respective tongues 19 and 20.

The curvature of the locking tongues is suitably chosen, so that, depending on the dimensions of notches there will be overlap of either tongue in two notches to prevent shifting of respective rods.

What I claim is:

1. A gearshift mechanism comprising a gearshift lever and a support housing therefore, a gimbal ring pivotally carried by said housing for rotation on a predetermined axis and lever support pin means carried by said gimbal ring and supporting said lever therein for swinging in a plane angularly related to the plane of swinging afforded by said gimbal ring; including support means on said housing for said gimbal ring comprising plastic bushings carried by said housing and pins on said gimbal ring disposed in said bushings; said housing having a pair of diametrically opposed slots to accommodate said bushings and a retaining ring force fitted about said housing and over said bushings for retaining said bushings on said housing whereby said gimbal ring and lever are retained.

2. A mechanism as set forth in claim 1, said lever support pin means comprising a pin extended diametrically across said gimbal ring and extending through a bore in said lever and a needle bearing supporting said lever on said pin.

3. A mechanism as set forth in claim 1, including a locking finger on each side of said lever and carried by said gimbal ring and being substantially coextensive therewith, said lever having a finger selectively movable, by swinging of said gimbal ring, into a notch of a selected shift rod; said locking fingers being movable by swinging of said gimbal ring into notches of other shift rods to prevent shifting thereof.

4. A mechanism as set forth in claim 3, wherein said locking fingers have terminal tongues provided with curvature so as to extend between notches of associated shift rods for locking a pair of shift rods.

5. A mechanism as set forth in claim 3, wherein said locking fingers have terminal tongues provided with curvature so as to extend between notches of associated shift rods for locking a pair of shift rods, and wherein said guided ring axis is coplanar with and at right angles to the axis of said support pin means.

6. A mechanism as set forth in claim 1, wherein said gimbal ring axis is coplanar with and at right angles to the axis of said support pin means.